3,449,425
N,N'-BIS(β-BENZOPHENONE)-ARYLENEDIAMINES
Ernst Reich, Bettingen, and Werner Dettwiler, Neu-Allschwil, Switzerland, assignors to Ciba Limited, Basel, Switzerland, a Swiss company
No Drawing. Filed Dec. 9, 1963, Ser. No. 329,297
Claims priority, application Switzerland, Dec. 11, 1962, 14,493/62; Nov. 14, 1963, 13,979/63
Int. Cl. C07c 97/10
U.S. Cl. 260—570     5 Claims

ABSTRACT OF THE DISCLOSURE

Nitro dyestuff pigments of the formula

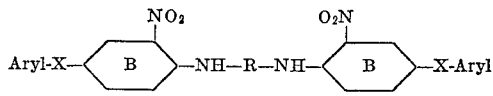

the aryl radical of which may represent, for example, naphthalene or advantageously benzene radicals, R represents an aromatic radical, X stands for a —CO— or $SO_2$— group and the benzene radical B may contain further substituents not imparting solubility in water.

---

The present invention provides nitro dyestuff pigments of the formula (1)

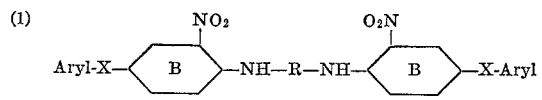

the aryl radical of which may represent, for example, naphthalene or advantageously benzene radicals, R represents an aromatic radical, X stands for a —CO— or $SO_2$— group and the benzene radical B may contain further substituents not imparting solubility in water.

The new dyestuff pigments may be obtained by condensing a compound of the formula (2)

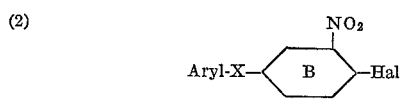

with an aromatic diamine in the molecular ratio 2:1.

The ortho-nitro-halogenaryl compound of the Formula 2 to be used in the process of this invention are advantageously manufactured by subjecting a 4-chloro-3-nitrobenzoic acid halide, or a corresponding sulfonylhalide, to a Friedel-Crafts condensation with an aryl compound, for example an aromatic hydrocarbon consisting of one or more fused rings and which may contain fused-on hetero rings or a derivative thereof substituted, for example, by halogen atoms or alkyl, phenyl, alkoxy, phenoxy or acylamino groups. As relevant examples there may be mentioned benzene, chlorobenzene, 1:2-, 1:3- or 1:4-dichlorobenzene, toluene, 1:2-, 1:3- or 1:4-dimethylbenzene, methoxybenzene, ethoxybenzene, 1-methyl-3-methoxybenzene, 1:3:5-trimethylbenzene, 1-methyl-2-, -3- or -4-chlorobenzene, 1:2-, 1:3- or 1:4-dimethoxybenzene, 1:3-dimethyl-4-chlorobenzene, diphenyl, diphenyl ether, acetanilide, naphthalene, diphenylene oxide, pyrene or fluoranthene.

Of special value as starting materials to be used in the present process are ortho-nitro-halogen-aryl compounds of the formula (3)

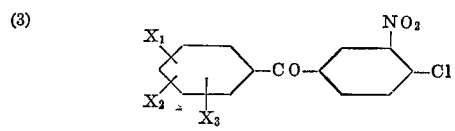

in which $X_1$, $X_2$ and $X_3$ each represents a hydrogen or halogen atom, or an alkoxy, phenoxy, alkyl, phenyl or acylamino group.

Preferred aromatic diamines are those of the diphenyl series, more especially those of the formula (4)

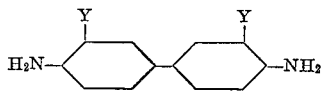

in which each Y represents an alkoxy group. As relevant examples the following diamines may be mentioned:

1:4-diaminobenzene,
1:3-diaminobenzene,
1:3-diamino-4-methylbenzene,
1:4-diamino-2-methylbenzene,
1:4-diamino-2:5-dimethylbenzene,
1:4-diamino-2-methoxybenzene,
1:4-diamino-2:5-dimethoxybenzene,
1:4-diamino-2:5-diethoxybenzene,
1:3-diamino-4:6-dimethylbenezne,
4:4'-diaminodiphenyl,
3:3'-dimethoxy-4:4'-diaminodiphenyl,
3:3'-dimethyl-4:4'-diaminodiphenyl,
3:3'-diethoxy-4:4'-diaminodiphenyl,
2:7-diaminodiphenylene oxide,
1:5-diaminoanthraquinone,
2:8-diaminochrysene,
2-(4'-aminophenyl)-6-aminobenzthiazole, and
2:7-diaminocarbazole.

The condensation may be performed in an organic solvent, such as nitrobenzene or alcohol or in water, preferably at an elevated temperature, if necessary in the presence of an acid acceptor such as sodium acetate, magnesium oxide or calcium carbonate, or of a catalyst such as copper oxide. When water is used as the reaction medium, it is of advantage to use the diamine in the form of its dihydrochloride.

The products obtained by the present process are yellow, orange to brown pigments sparing soluble in all organic solvents. They are suitable for coloring a wide variety of organic products, for example plastic substances such as rubber, casein, polymerisation resins such as polyvinyl chloride and its copolymers, polyvinyl acetals, polyethylene, polypropylene, polystyrene and its copolymers with polyesters from unsaturated dicarboxylic acids and diols, polyacrylates and their copolymers, silicone and silicone resins. Furthermore, the pigments to be used according to the present invention are suitable for the manufacture of colored condensation resins, especially aminoplasts, for example urea formaldehyde or melamine formaldehyde resins, polyaddition resins such as epoxy or polyurethane resins or alkyd resins, and for the manufacture of colored lacquers containing one or more of the resins mentioned in an organic solvent, or aqueous emulsions containing one or more of the said resins or precondensates, if desired in the presence of an organic solvent, for example an oil-in-water or water-in-oil emulsion. Such emulsions are particularly suitable for impregnating or printing textile materials or other flat materials such as paper, leather or glass fiber fabrics, if necessary followed by curing with application of heat. The pigments to be used according to the present invention may also be used for the manufacture of spin-dyed fibers, for example of viscose rayon, cellulose esters or polyacrylonitrile. They can also be used with advantage in the manufacture of cosmetics.

The pigments to be used in the present process are generally obtained from the synthesis in a physically useful form, and it is advantageous to bring them into a finely divided state before their application, for example by grinding the crude pigments in the dry or aqueous-moist form with or without addition of an organic solvent and/or of a slat that can be subsequently washed out.

The pigments to be used in the present process may be used either in the pure form as so-called "toners" or in the form of preparations in which the pigment is finely dispersed and has a particle size not exceeding 3μ. Such preparations, which may also contain the usual additives, for example dispersants or binders, can be manufactured in known manner by intensive mechanical treatment, for example on roller mills or in suitable kneaders. For this purpose the medium which acts as a dispersant and is suitable for the intensive mechanical treatment of the material is so chosen as to suit the purpose in hand, for example for the manufacture of aqueous dispersible preparations sulfite cellulose waste liquor or a dinaphthylmethanedisulfonate is used, and for the manufacture of acetate rayon spinning preparations acetylcellulose admixed with a small amount of a solvent is convenient.

Owing to the physically advantageous form in which the products of the present invention are generally obtained, and owing to their chemical inertness and good stability towards heat they are in general easy to disperse in the materials or preparations of the kind referred to above. The dispersion is advantageously carried out at a stage when the materials or preparations are not yet in their final form. The operations required in their shaping, as for example spinning, pressing, curing, casting and glueing can thus be carried out in the presence of the new pigments without difficulty, and without interference by reactions with the substrata, such as further polymerisation, condensation or polyaddition.

Unless otherwise indicated, parts and percentages in the following examples are by weight.

EXAMPLE 1

A mixture of 31.7 parts of the dihydrochloride of 3:3'-dimethoxy-4:4'-diaminodiphenyl, 55 parts of 3-nitro-4-chlorodiphenylketone, 56 parts of crystalline sodium acetate, 3 parts of sodium diisobutyl-naphthalenesulfonate and 30 parts of water was heated to the boiling point in a round-bottom flash equipped with stirrer, condenser and thermomether, and refluxed for 24 hours with vigorous stirring. The orange-colored reaction product was then filtered off while still hot and washed on the suction filter with hot water until the washings were free from salts. The filter residue was dried and recrystallised first from nitrobenzene and then from γ-butyrolactone, whereupon a condensation product of the formula The pigment colored polyvinyl chloride in the mass orange shades having good properties of fastness to light and migration.

When used in spin-dyeing viscose rayon the new pigment produced brilliant reddish orange shades having excellent fastness properties to wet processing and good fastness to light.

Dyeing instructions 5 parts of the new pigment were mixed with 95 parts of dioctyl phthalate and ground in a ball mill until the pigment particles had been reduced to a size smaller than 3μ. 0.8 part of this dioctyl phthalate paste were mixed 13 parts of polyvinyl chloride, 7 parts of dioctyl phthalate and 0.1 part of cadmium stearate and then rolled for 5 minutes at 140° C. on a two-roller mill. An orange colored film was obtained. The color had good fastness to light and migration.

EXAMPLE 2

A mixture of 24.4 parts of 3:3'-dimethoxy-4:4'-diaminodiphenyl, 72.7 parts of 3-nitro-trichlorodiphenylketone (prepared from 3-nitro-4-chlorobenzoyl chloride and 1:2-dichlorobenzene by the Friedel-Crafts reaction), 18 parts of anhydrous sodium acetate and 300 parts by volume of nitrobenzene was heated with stirring to 180° C. in the apparatus described in Example 1. The two condensation components passed into solution, and after some time the reaction product began to settle out. The batch was stirred at about 180° C. until free amine could no longer be detected. The mixture was then cooled to room temperature, the orange brown condensate was filtered off and washed on the suction filter with nitrobenzene, then with chlorobenzene and finally with alcohol. The filter cake was suspended in 1,000 parts of water, stirred for 30 minutes at about 90° C., filtered, washed until free from salts, and dried. On recrystallisation from nitrobenzene and then from γ-butyrolactone the condensation

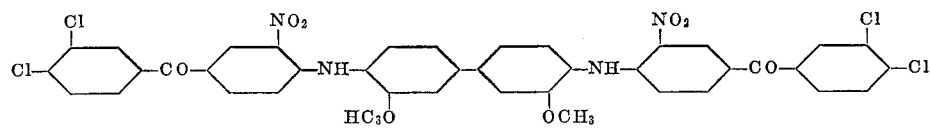

product of the probable formula
gave the following analysis:
Calculated: C, 57.71; H, 3.15; N, 6.58; Cl, 17.03%.
Found: C, 57.89; H, 3.45; N, 6.73; Cl, 16.78%.

The new pigment colored plasticised polyvinyl chloride in the mass yellowish orange tints having good fastness to light and migration.

When used for spin-dyeing viscose rayon the new pigment produced yellowish orange shades having very good fastness to wet processing and good fastness to light.

When 1 mol of 3:3'-dimethoxy-4:4'-diaminodiphenyl

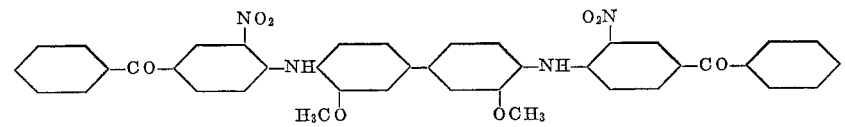

was obtained; it gave the following analysis:
Calculated: C, 69.16; H, 4.35; N, 8.07%. Found: C, 69.37; H, 4.28; N, 7.81%.

was condensed as described in the first paragraph above with 2 mols of the ketones obtained from 3-nitro-4-chlorobenzoyl chloride and the compounds listed in Column I of the following table, pigments having the tinctorial properties shown in Column II were obtained:

tallisation from nitrobenzene or chlorobenzene the condensation product of the formula

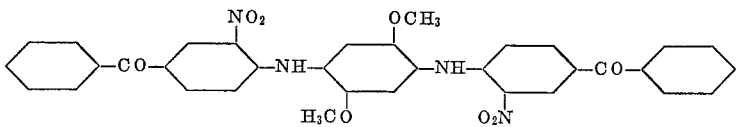

gave the following analysis:
Calculated: C, 66.01; H, 4.24; N, 9.06%. Found: C, 65.77; H, 4.37; N, 8.80%.

In the viscose spin-dyeing process, the new pigment dyed the cellulose filament brilliant, greenish yellow shades having good fastness to light and excellent fastness to wet processing.

EXAMPLE 4

When 19.6 parts of 2:5-diethoxy-1:4-diaminobenzene were condensed as in Example 3 with 62.2 parts of 3-nitro-4:4'-dichlorodiphenylketone or with 60.8 parts of 3-nitro-4-chloro-4'-methyldiphenylketone, pigments were obtained which on dispersion in a viscose spinning mass produced after spinning transparent, brownish red or reddish orange cellulose fibers having good fastness to light and very good fastness to wet processing.

EXAMPLE 5

A mixture of 27.2 parts of 3:3'-diethoxy-4:4'-diaminodiphenyl, 55 parts of 3-nitro-4-chlorodiphenylketone, 18 parts of anhydrous sodium acetate and 200 parts by volume of nitrobenzene was heated with stirring to about 200° C. in the apparatus described in Example 1 and maintained at this temperature. The reaction mixture evolved acetic acid and after 20 hours at most a free amino group could no longer be detected. After cooling to room temperature the orange-red condensate was filtered off and washed on the suction filter with nitrobenzene, then with chlorobenzene and finally with alcohol. The filter cake was then suspended in 1,000 parts of water, stirred for about ½ hour at about 90° C., filtered off, washed until free from salts and dried. On recrystallisation from nitrobenzene and then from γ-butyrolactone the pigment of the formula

|   I                    | II Tinctorial property                                                                                                                                                                 |
|------------------------|----------------------------------------------------------------------------------------------------------------------------------------------------------------------------------------|
| 1. Chlorobenzene       | Colored polyvinyl chloride yellow having good fastness to light and migration. When used in a viscose rayon spinning mass it produced yellowish orange-colored fibers having good fastness to light and very good fastness to wet processing. |
| 2. 1:3-dichlorobenzene | Colored polyvinyl chloride reddish yellow tints having good fastness to light. |
| 3. 1:4-dichlorobenzene | Colored polyvinyl chloride yellow shades of good fastness to light. |
| 4. Methylbenzene       | Colored polyvinyl chloride orange shades of very good fastness to light. |
| 5. 1:3-dimethylbenzene | Do. |
| 6. 1:4-dimethylbenzene | Do. |
| 7. 1-methyl-3-chlorobenzene | Do. |
| 8. 1-methyl-4-chlorobenzene | Do. |
| 9. Methoxybenzene      | Colored polyvinyl chloride orange shades of good fastness to light. When used in a viscose rayon spinning mass it produced brownish orange fibers having good fastness to light and excellent fastness to wet processing. |
| 10. 1:4-dimethoxybenzene | Colored polyvinyl chloride reddish yellow tints of very good fastness to light. When used in a viscose rayon spinning mass it produced reddish yellow fibers having good fastness to light and very good fastness to wet processing. |
| 11. Diphenyl ether     | Colored polyvinyl chloride orange shades of good fastness to light. |
| 12. Acetanilide        | Colored polyvinyl chloride red-brown shades of good fastness to light and migration. |
| 13. Benzanilide        | Colored polyvinyl chloride orange shades of good fastness to light. When used in a viscose rayon spinning mass it produced brownish orange fibers of good fastness to light and excellent fastness to wet processing. |
| 14. Naphthalene        | Colored polyvinyl chloride orange tints of good fastness to light. |

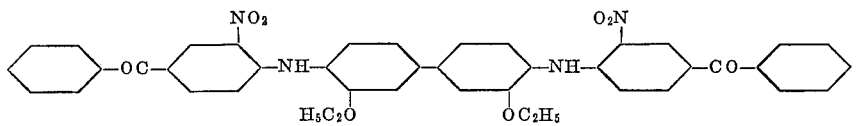

Dyeing instructions 4.5 parts of the pigment obtained as described in the first paragraph of this example were ground with 4.5 parts of the sodium salt of 1:1'-dinaphthylmethane-2:2'-disulfonic acid and 21 parts of water in a known type of colloid mill until all the pigment particles were reduced to less than 1μ.

When the above pigment suspension was added to a viscose rayon spinning mass and the whole spun in the usual manner, a yellowish orange cellulose filament was obtained. The color displayed good fastness to light and very good fastness to wet processing.

EXAMPLE 3

A mixture of 16.8 parts of 2:5-dimethoxy-1:4-diaminobenzene, 55 parts of 3-nitro-4-chlorodiphenylketone, 17.2 parts of anhydrous sodium acetate and 205 parts by volume of nitrobenzene was heated with stirring at 180° C. in an apparatus as described in Example 1. The two condensation components passed into solution and the mixture was stirred for 20 hours at about 180° C. After cooling to room temperature, the reaction product precipitated in the form of a thick crystal magma; it was filtered off and washed on the suction filter with nitrobenzene until the filtrate was yellow. After recrysgave the following analysis:
Calculated: C, 69.79; H, 4.74; N, 7.75%. Found: C, 69.50; H, 4.88; N, 7.73%.

The new pigment colored polyvinyl chloride in the mass orange shades having very good fastness to light and migration. Futhermore, it colored lacquers, e.g. melamine resin stoving lacquers, or acrylic resin lacquers, orange tints having good fastness to light and excellent fastness to over-lacquering.

When, as described in the first paragraph of this example, 1 mol of 3:3'-diethoxy-4:4'-dimainodiphenyl was condensed with 2 mols of the ketones obtained from 3-nitro-4-chlorobenzoyl chloride and the compounds listed in Column I of the following Table, pigments were obtained having the properties shown in Column II:

|   I                      | II Tinctorial property                                                                                                              |
|--------------------------|-------------------------------------------------------------------------------------------------------------------------------------|
| 1. Chlorobenzene         | Colored polyvinyl chloride yellowish orange tints of good fastness to light and migration. |
| 2. Methylbenzene         | Colored polyvinyl chloride yellowish orange tints of good fastness to light. |
| 3. Diphenyl ether        | Do. |
| 4. Diphenyl              | When used in a viscose spinning mass it produced strongly reddish orange fibers of good fastness to light and outstanding wet fastness. |
| 5. Ortho-dichlorobenzene | Colored lacquers golden yellow shades of good fastness to light and excellent fastness to over-lacquering. Furthermore, it colored polyvinyl chloride golden yellow shades of very good fastness to light and migration. |

EXAMPLE 6

A mixture of 13.6 parts of 2:5-dimethyl-1:4-diaminobenzene, 72.7 parts of 3-nitro-trichlorodiphenylketone, 18 parts of anhydrous sodium acetate and 175 parts by volume of nitrobenzene was reacted as described in Example 5 in the apparatus used in Example 1, and the condensation product similarly worked up. On recrystallisation from ortho-dichlorobenzene and then from γ-butyrolactone the pigment of the probabel formula

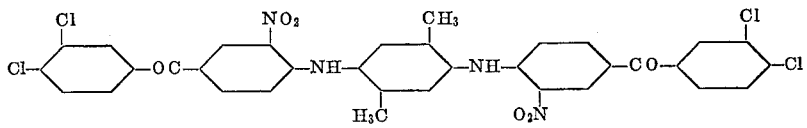

gave the following analysis:
Calculated: C, 56.38; H, 3.06; N, 7.73%. Found: C, 56.26; H, 3.15; N, 7.84%.

When the pigment was dispersed in a viscose spinning mass and the spun, it produced yellowish red cellulose fibers having very good fastness to wet processing and good fastness to light.

The new pigment colored polyvinyl chloride in the mass similar shades of good fastness to light. Yellow shades of very good fastness to light were also obtained when polyvinyl chloride in the mass was dyed with condensation products which contain a benzene, chlorobenzene or methylbenzene residue in the ketone component instead of a 1:2-dichlorobenzene residue.

EXAMPLE 7

A mixture of 19.8 parts of 2:7-diaminodiphenylene oxide, 62.2 parts of 3-nitro-4:4'-dichlorodiphenylketone, 18 parts of anhydrous sodium acetate and 250 parts by volume of nitrobenzene was reacted as described in Example 5 in the apparatus used in Example 1, and the condensation product was worked up as described above. On recrystallisation from ortho-dichlorobenzene and then from γ-butyrolacetone the pigment corresponded to the formula

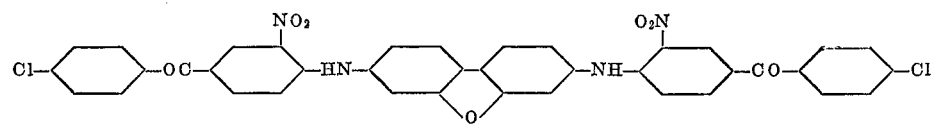

and gave the following analysis:
Calculated: C, 63.61; H, 3.09; N, 7.81%. Found: C, 63.22; H, 3.45; N, 7.80%.

The new pigment colored polyvinyl chloride greenish yellow shades of good fastness to light.

Even more greenish shades were obtained with a pigment in which the ketone component contained the residue of 1:2-dichlorobenzene instead of chlorobenzene.

EXAMPLE 8

A mixture of 23.8 parts of 1:5-diaminoanthraquinone, 71.4 parts of 3-nitro-4-chlorodiphenylsulfone, 23 parts of anhydrous sodium acetate, 1.4 parts of cuprous chloride and 400 parts by volume of nitrobenzene was heated in the apparatus used in Example 1 with stirring until the nitrobenzene boiled and then vigorously stirred at the same temperature for about 90 hours. After cooling to room temperature and filtering the filter cake was washed with alcohol, recrystallised from ortho-dichlorobenzene and then from γ-butyrolactone. After drying, a scarlet powder of the formula

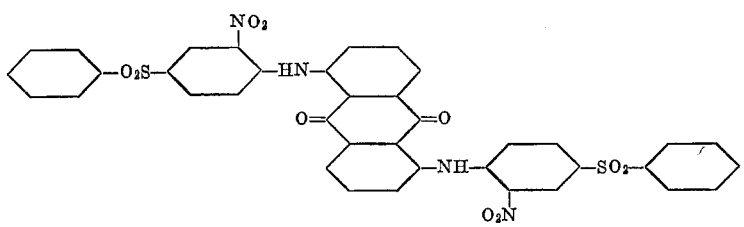

was obtained which gave the following analysis:
Calculated: C, 60.00; H, 3.18; N, 7.36; S, 8.43%. Found: C, 59.71; H, 3.17; N, 7.11; S, 8.34%.

The new pigment colored polyvinyl chloride orange shades of very good fastness to light and good fastness to migration. A pigment derived from 3:3'-dimethoxy-4:4'-diaminodiphenyl as the middle-component colored polyvinyl chloride orange shades of good fastness to light and very good fastness to migration.

The condensation products from 3:3'-dimethoxy- or 3:3'-diethoxy-4:4'-diaminodiphenyl and 3-nitro-trichloro-diphenyl sulfone colored polyvinyl chloride golden yellow shades fast to light.

When used in the viscose spin-dyeing process, the pigment obtained as described in the first paragraph above produced fibers of regenerated cellulose of red-brown shades having very good fastness to light and good fastness to wet processing.

The pigments containing 3:3'-dimethoxy- or 3:3'-diethoxy-4:4'-diaminodiphenyl as the middle component, yielded rayon of reddish orange shades of good fastness to light and wet processing by the spin-dyeing process.

What we claim is:
1. A nitro dyestuff of the formula

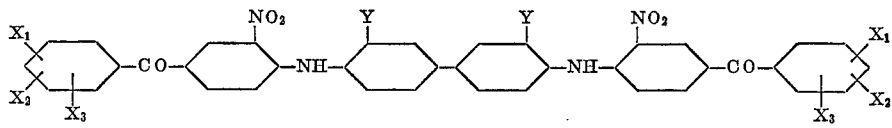

in which $X_1$, $X_2$, and $X_3$ each represents a member selected from the group consisting of hydrogen and chlorine atoms, lower alkoxy, phenoxy, lower alkyl, and phenyl groups and each Y stands for a lower alkoxy group.

2. The dyestuff of the formula
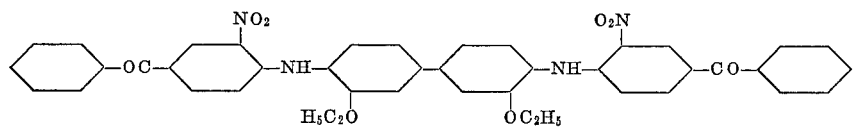
3. The dyestuff of the formula
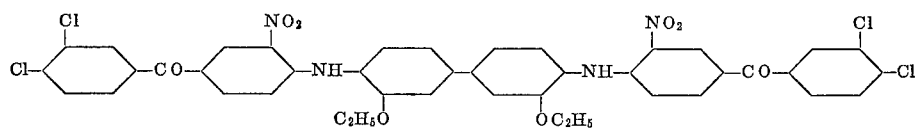
4. The dyestuff of the formula
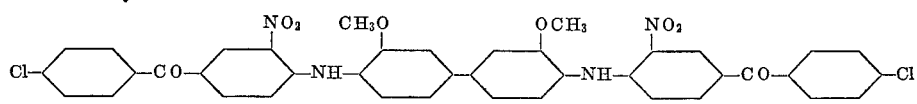
5. The dyestuff of the formula
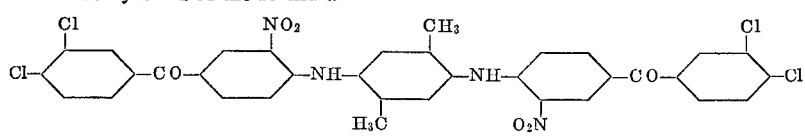
References Cited
UNITED STATES PATENTS
1,954,377   4/1934   Calcott et al. _____ 18—50
ROBERT V. HINES, *Primary Examiner.*
U.S. Cl. X.R.
8—5, 7, 12, 24, 40, 55; 106—148, 164, 193, 204; 260—39, 44, 346, 347.7, 349.2, 374, 376, 501.19, 501.21, 543, 544, 561, 562, 571, 575, 576, 591, 607, 612